Patented Feb. 5, 1929.

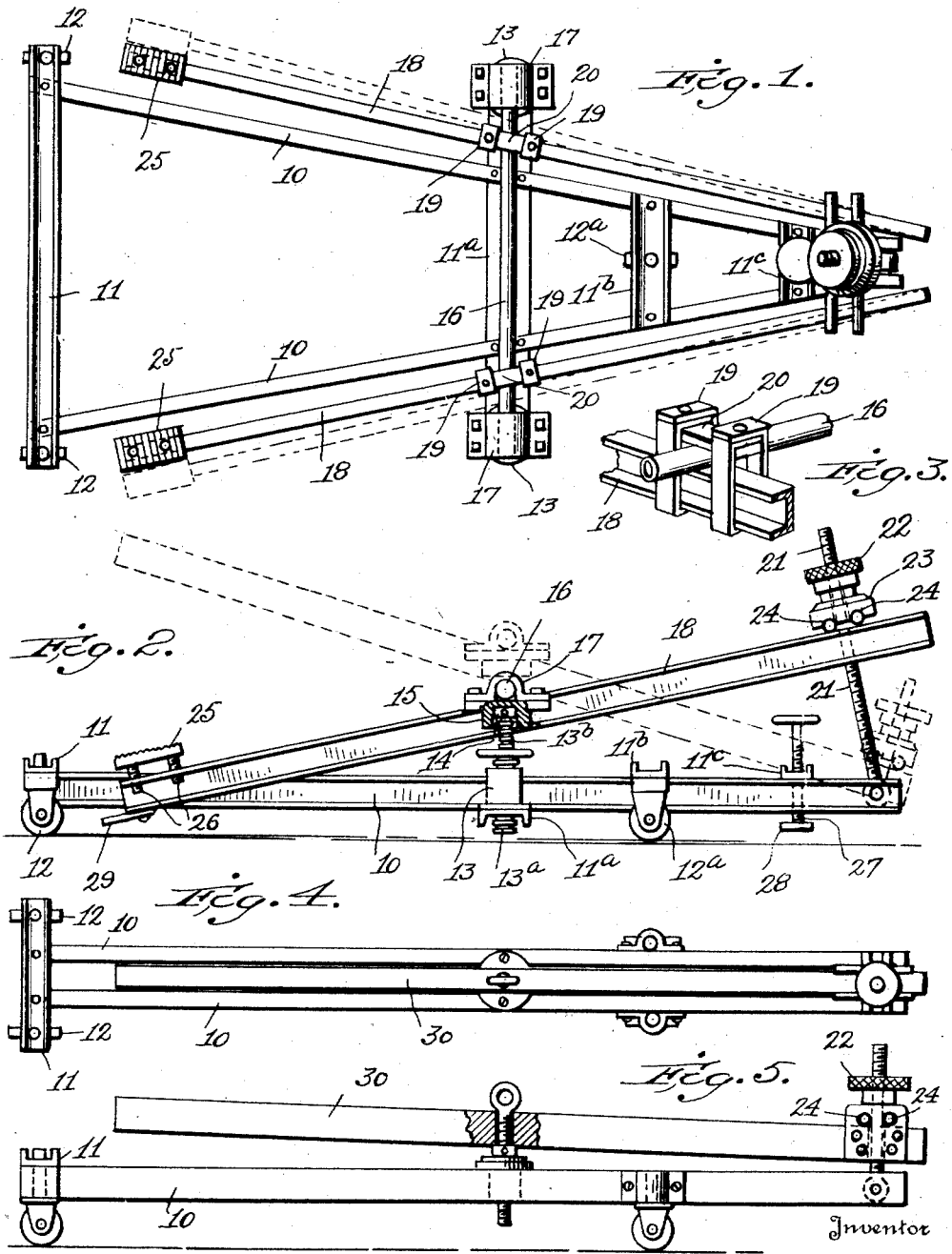

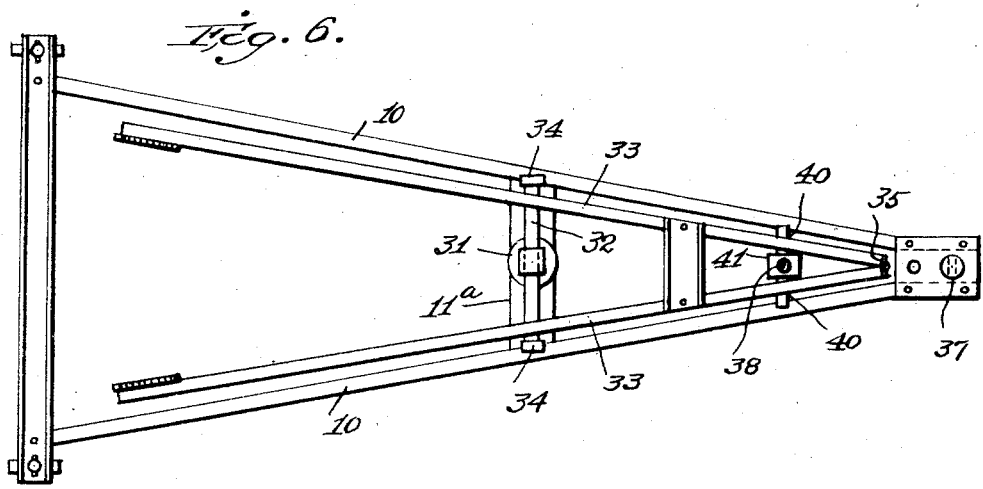
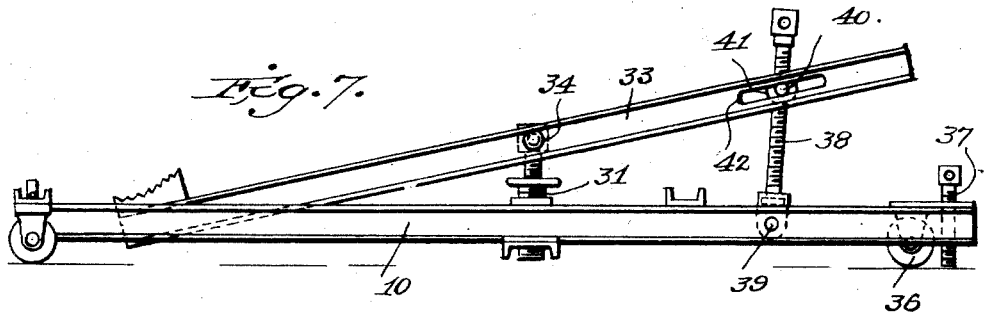
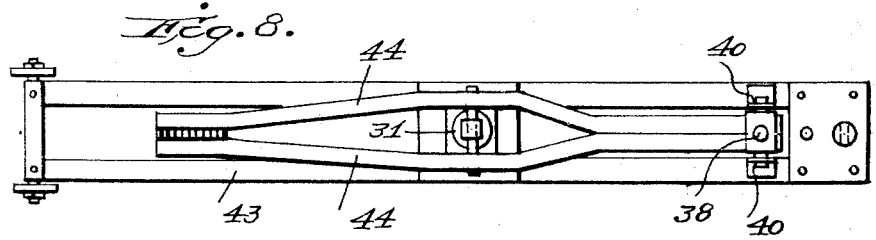

1,701,134

UNITED STATES PATENT OFFICE.

GUY B. WAITE, OF NEW YORK, N. Y.

LIFTING JACK.

Application filed October 23, 1925. Serial No. 64,368.

This invention relates to improvements in lifting-jacks, especially of the type which are used in garages for lifting motor vehicles, and has for its particular objects to provide a novel and more efficient jack which can be easily inserted under parts of an automobile that hang close to the ground, and also to raise objects extremely high when desired. Other objects of the invention are to provide a device of this character which is simple in construction, strong, and readily manipulated.

These and other objects hereinafter set forth are attained by the means illustrated in the accompanying drawing; in which:

Figure 1 is a plan view of the improved jack.

Figure 2 is a side elevation thereof.

Figure 3 is a detail perspective view showing one of the lifting-arm supports.

Figure 4 is a plan view of a modified form of jack, and

Figure 5 is a side elevation thereof, and

Figures 6, 7 and 8 are views showing other modified forms of jacks.

Similar reference numbers in all figures of the drawings designate like parts.

In carrying out the invention, there is provided an elongated truck formed of longitudinally arranged side-beams 10 and transverse tie-beams 11, 11$^a$, 11$^b$ and 11$^c$, which are of different lengths to space the front ends of the side-members 10 further apart than their rear-ends to form a triangular shaped structure as illustrated. This triangular shape is the preferred form, and the members of the frame are preferably formed of channelled metal to secure lightness and strength. The ends of member 11 are extended beyond the ends of the members 10, and in these extended ends are pivoted the front-wheels 12. At the rear end of the frame, in member 11$^b$ is pivoted another wheel 12$^a$, the same being located at a central point between the ends of said member 11$^b$; these wheels 12 and 12$^a$ are preferably of the caster-wheel type and with them, the jack can be shifted from place to place, with or without a load.

Transverse tie-beam 11$^a$ also has its ends extended beyond the beams 10 on each side, and on each of these extended ends is mounted in any suitable manner a screw-jack preferably of the telescopic screw type. Each of these screw-jacks comprises a nut 13 fixed to the beam 11$^a$, a main screw 13$^a$ engaging said nut, and an extension screw 13$^b$ which is adapted to engage an internal thread in the bore of the main screw 13$^a$. Extension screws 13$^b$ are each provided with a head 14 which is adapted to engage and be fixed in a recess formed in a support 15 adapted to support one end of a trunnion-bar 16, said bar 16 being secured to the support by looped straps 17 bolted to the top face thereof. This trunnion-bar 16 pivotally supports the lifting member composed of the lifting levers 18, one adjacent to each lifting-jack, said lifting levers being pivoted intermediate their ends, and are connected to the trunnion-bar by means of a yoke comprising a pair of loops 19 which are enclosed around the lifting-levers and on opposite sides of the trunnion-bar, and a bearing-plate 20 connecting the top sides of said loops 19 and adapted to bear upon the upper side of the trunnion-bar, as clearly shown in Figure 3.

The lifting-levers 18 forming the lifting member are supported substantially in parallel relation to the frame-beams 10 and outside of the same, and their rear-ends are depressed by a forcing-means embodying a vertically arranged screw 21 pivoted at its lower end between the rear-ends of the frame-beams 10, a screw nut 22, and a bearing-block 23 mounted on transverse roller bars 24 which span across the rear ends of the lifting levers and positioned on opposite sides of the screw 21, said rollers being free to roll upon the upper face of the lifting-levers when they are being adjusted to different positions. At the front end of each lifting-lever 18 is preferably mounted a serrated engagement plate 25 which is adjustable up and down with respect to the upper face of the lifting-lever by the screws 26.

Mounted in transverse tie-beams 11$^c$ is a frame lifting screw 27, the same being provided at its lower end with a foot 28 adapted to engage the floor or ground and thus elevate the rear-end of the jack-truck when desired.

The front ends of the lifting-levers may also be provided with engaging plates 29 preferably secured to the lower flanges of the lifting-levers and which are adapted to be used when it is desired to secure a very low hold upon an article to be lifted.

The yoke connection of the lifting-levers and the trunnion-bar is sufficiently loose to permit a lateral adjustment of the lifting-levers as indicated in dotted lines in Figure 1.

It will be understood that the telescopic screw-jacks used for lifting the fulcrum-bar 16 may be of any well known construction with or without operating gears as desired.

In the modified form shown in Figures 4 and 5, only one lifting lever 30 is used, which is operated in a similar manner to the levers 18 above described. This is a simplified form which can be carried without taking up much room.

In the modified form shown in Figures 6 and 7, a triangular frame is used similar to the one shown in Fig. 1, and also a tie-beam 11ª. Only one jack 31 is used in this form and which is preferably located midway on the tie-beam 11ª and supports the fulcrum bar 32 whose ends extend through the walls of the lifting levers 33, and are shown provided with limit heads 34 which may be removable. The rear ends of the lifting levers forming the lifting member are pivotally connected together at their rear ends, as shown at 35, to enable them to be shifted laterally when desired. It will be observed that in this form the lifting levers are located and operate within the outer side-bars of the supporting frame, which provides a more compact structure. The rear truck wheel 36 is positioned closely adjacent the rear end of the supporting frame, and the ground engaging screw 37 is preferably located at the end of the frame beyond the rear ends of the lifting member. The depressing screw 38 is pivoted to the frame at 39 and is also pivoted to the lifting member at 40, said screw being treaded through a nut 41 which carries the pivots 40, and said pivots are engaged in slots 42 in the walls of the lifting levers, whereby the pivots 40, and screw 38, can move longitudinally of the lifting levers to assume new pivot positions when the fulcrum rod 31 is adjusted either up or down.

Fig. 8 shows a form similar to that shown in Figs. 6 and 7, excepting that a relatively narrow rectangular frame 43 is used, and wherein the lifting levers 44 are centrally bowed and have their front and rear ends connected together. In this form also, only one jack 31 is used.

In use, the front end of the truck is run under the object while the lifting levers are in the position shown in Figure 2 of the drawing, then the fulcrum rod screw or screws are adjusted to raise the engagement plates 25 into engagement with the load, and finally the nut 22 is screwed downwardly thereby depressing the rear ends of the levers 18 and consequently lifting their front ends and the load. It is clearly obvious that the fulcrum of the lifting levers can be adjusted either upwardly or downwardly to engage a high or low object to be lifted, and depending upon certain circumstances, either the fulcrum screw, or the depressing screw, or both, can be used for lifting the object. The nut 22 can be provided with an operating handle, and a ratchet mechanism if desired. Screw 27 can be used to engage the ground or floor to act as a brake and prevent rolling of the wheeled frame, or it can be used to lift the rear end of the truck from off the ground to further elevate portions of the jack to secure a higher lift of the object when desired.

It is not necessary that the frame should be constructed in the manner shown, as details can obviously be changed without number. Nor is it necessary to use screws for raising or adjusting. It is quite evident that any form of well known means for raising or lowering can be employed in the place of the screws and screw-jacks shown.

Having thus fully described the invention, what is claimed is:—

1. A lifting-jack, embodying a frame having a screw jack at opposite sides thereof, a pair of lifting members pivotally supported by said screw jacks and having front ends constructed to engage an object to be lifted and extended rear ends, and a single means connected to said supporting frame and constructed to engage both of said lifting members at their rear ends and positively force them downwardly and rock them upon the screw jacks.

2. A lifting-jack, embodying a supporting frame, a pair of lifting members having front ends constructed to engage an object to be lifted and extended rear ends, a fulcrum means for said members, a screw for each end of said fulcrum means to adjust the same, and a single operating means connected at the rear end of the supporting frame for depressing both of the rear ends of said lifting members.

3. A lifting-jack, embodying a frame having a screw jack at opposite sides thereof, a fulcrum bar extending across said frame and having its ends supported by said screw jacks, a pair of lifting members pivotally supported by said fulcrum bar and having front ends constructed to engage an object to be lifted and extended rear ends, and a single means connected to the rear end of said supporting frame and engaging both of the rear ends of said lifting members for operating the same forcibly downward.

4. A lifting jack, embodying a supporting frame, a lifting means carried by said frame, a lifting member pivoted intermediate its length to said lifting means, and a depressing means for engaging a portion of the lifting means to rock the same on its pivots, said depressing means being slidably and pivotally connected to the lifting member.

5. A lifting-jack, embodying a supporting frame, a lifting member having one end constructed to engage an object to be lifted and an extended rear end, and a plurality of separate screw operating carried by said supporting frame and constructed to engage the extended rear end and also an intermediate portion of said lifting member in a manner to permit the rocking of the lifting member on either one of the screw operating means as a fulcrum when the other screw operating means is operated.

6. A lifting jack, embodying a supporting frame, a lifting member having one end constructed to engage an object to be lifted and an extended rear end, and a plurality of separate screw operating means carried by said supporting-frame and constructed to engage the extended rear end and also an intermediate portion of said lifting member in a manner to permit the rocking of the lifting member on either one of the screw operating means as a fulcrum when the other screw operating means is operated, the extended rear end of the lifting member having a loose engagement with its screw operating means to permit a lateral movement between said members when being adjusted to different portions.

In testimony whereof I have affixed my signature.

GUY B. WAITE.